(12) United States Patent
Sazuka et al.

(10) Patent No.: US 7,387,417 B2
(45) Date of Patent: Jun. 17, 2008

(54) VEHICULAR HEADLAMP

(75) Inventors: Kiyoshi Sazuka, Shizuoka (JP);
Hiroyuki Ishida, Shizuoka (JP);
Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 243 days.

(21) Appl. No.: 10/978,454

(22) Filed: Nov. 2, 2004

(65) Prior Publication Data
US 2005/0094413 A1   May 5, 2005

(30) Foreign Application Priority Data
Nov. 4, 2003   (JP) .......................... P.2003-374061

(51) Int. Cl.
*F21V 14/00*   (2006.01)

(52) U.S. Cl. ...................................... 362/544; 362/545

(58) Field of Classification Search ................ 362/538, 362/507, 509, 521, 522, 545
See application file for complete search history.

(56) References Cited

U.S. PATENT DOCUMENTS 4,225,906 A * 9/1980 Gulliksen et al. ............ 362/254
6,095,672 A * 8/2000 Beninga et al. .............. 362/545
6,637,923 B2 * 10/2003 Amano ........................ 362/545
7,201,506 B2 * 4/2007 Ishida et al. ................. 362/544
7,261,448 B2 * 8/2007 Ishida et al. ................. 362/507
2005/0068787 A1 * 3/2005 Ishida .......................... 362/538
2005/0094411 A1 * 5/2005 Ishida et al. ................. 362/538

FOREIGN PATENT DOCUMENTS

| DE | 199 61 942 A1 | 6/2001 |
| JP | 2003-31007 A | 1/2003 |
| JP | 2003-31011 A | 1/2003 |
| JP | 2003-123517 A | 4/2003 |

* cited by examiner

*Primary Examiner*—Anabel M Ton
(74) *Attorney, Agent, or Firm*—Sughrue Mion, PLLC

(57) ABSTRACT

Lamp piece units in a parabolic pillar type capable of forming a luminous intensity distribution pattern prolonged sideways are formed as side irradiating lamp piece units. Thereby, a portion of diffused and reflected light from reflectors of the respective side irradiating lamp piece units is prevented from being blocked by other lamp piece constituting members, even when a surface shape of a vehicular headlamp is flexed to the rear side. Further, although the respective side irradiating lamp piece units are constituted by the lamp piece units of the parabolic pillar type having an angular outer shape as a whole, a large depth space for arranging the units is dispensed with.

15 Claims, 14 Drawing Sheets

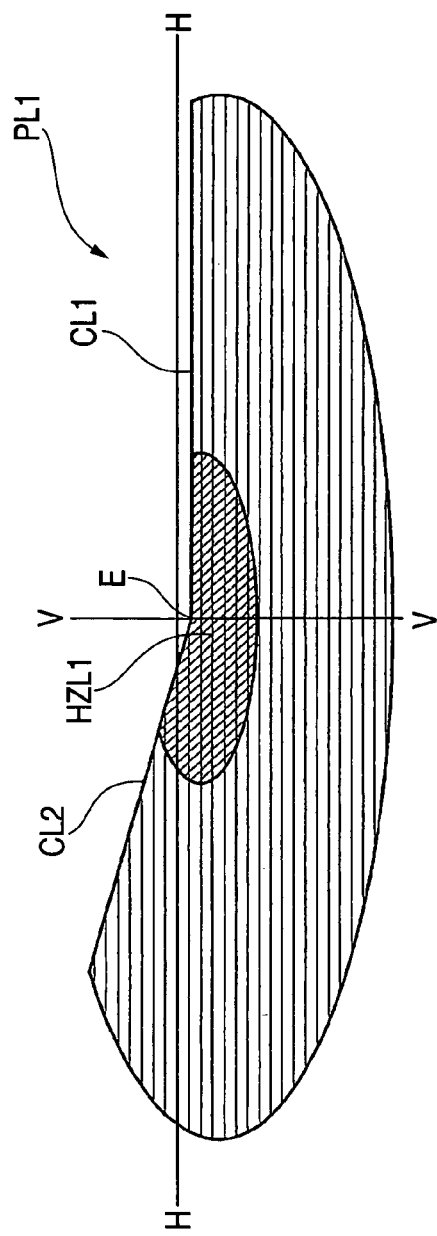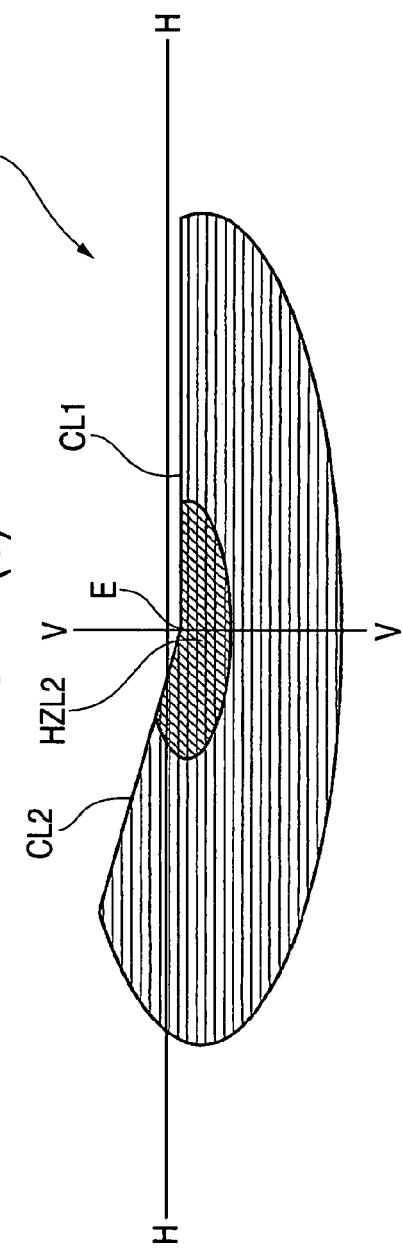

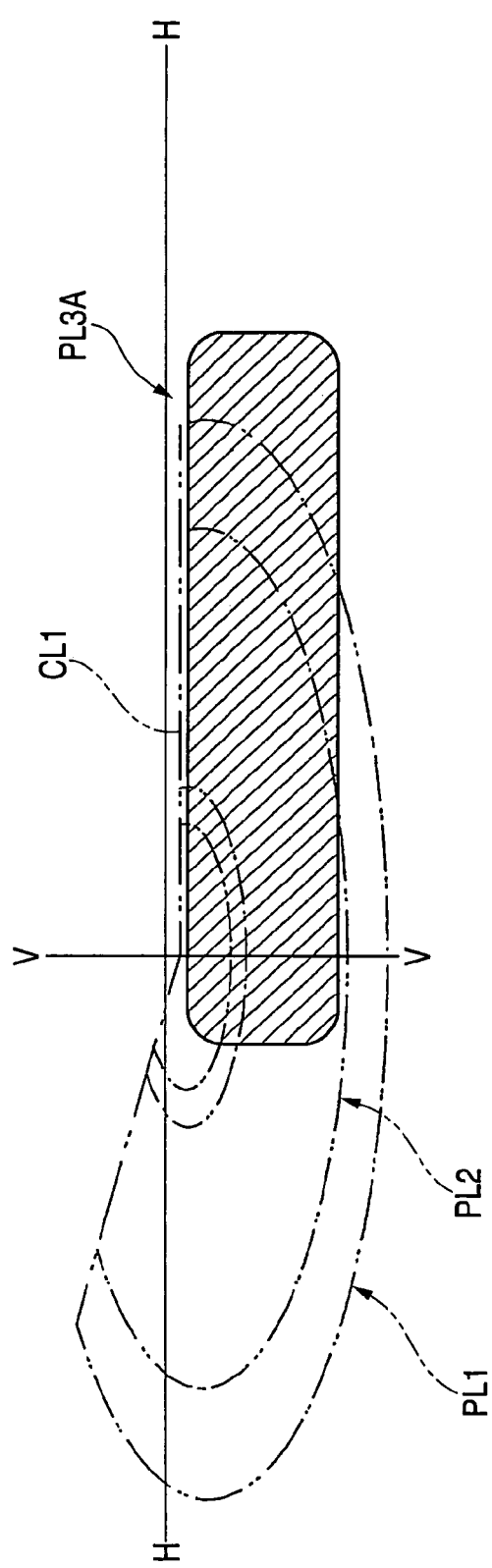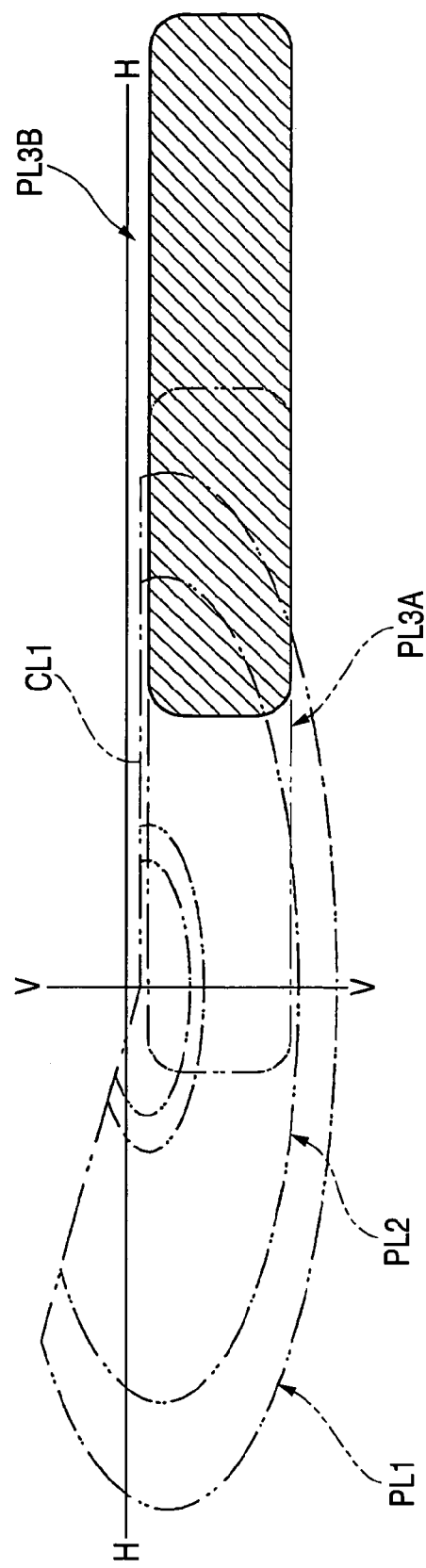

VEHICULAR HEADLAMP

The present application claims foreign priority under 35 USC 119 based on Japanese Patent Application No. 2003-374061, filed Nov. 4, 2003, the contents of which is incorporated herein by reference.

BACKGROUND OF THE INVENTION

1. Technical Field

The present invention relates to a vehicular headlamp that forms a luminous intensity distribution pattern for a low beam by irradiating light from a plurality of lamp piece units, each of which constitutes a light source by a semiconductor light emitting element.

2. Related Art

In the related art, a vehicular headlamp is able to form a luminous intensity distribution pattern for a low beam having a cutoff line at an upper end edge thereof, to ensure front recognizability of a driver of one's own car as much as possible while preventing the casting of glare to a driver of a car running on the opposite side or the like.

In such a case, Japanese publication JP-A-2003-123517 describes a vehicular headlamp constituted to form a luminous intensity distribution pattern for low beam by irradiating light from a plurality of lamp piece units each constituting a light source by a semiconductor light emitting element.

Further, Japanese publications JP-A-2003-31007 and JP-A-2003-31011 describe a vehicular lamp piece of a parabolic pillar type constituted to reflect light from a plurality of semiconductor light emitting elements linearly aligned in a horizontal direction to a front side of the lamp piece by a reflector including a reflecting face comprising a curved face in a shape of a parabolic pillar.

By adopting the lamp piece constitution described in JP-A-2003-123517, thin formation of the vehicular headlamp can be achieved in the related art. In such a case, when the vehicular lamp piece of the parabolic pillar type described in JP-A-2003-31007 and JP-A-2003-31011 is adopted as a lamp piece unit, a luminous intensity distribution pattern prolonged sideways can be formed to enable formation of a wide diffusing region of the luminous intensity distribution pattern for the low beam.

However, in a number of related art vehicular headlamps, a shape of surface thereof is formed to flex to a rear side from an inner side of a vehicle width direction to an outer side in the vehicle width direction. Therefore, when the vehicular lamp piece of the parabolic pillar type described in JP-A-2003-31007 or JP-A-2003-31011 is adopted as the lamp piece unit in a lamp piece constitution in which a plurality of lamp piece units are arranged simply to direct to a front direction of a vehicle as in the vehicular lamp piece described in JP-A-2003-123517, the following related art problem occurs.

When the lamp piece unit of the parabolic pillar type is arranged to direct to the front direction of the vehicle in the vehicular headlamp having the surface shape flexed to the rear side, there is a related art problem in that a portion of diffused and reflected light from the reflector is blocked by other lamp piece constituting member and the luminous intensity distribution pattern prolonged sideways cannot be formed.

Further, the lamp piece unit of the parabolic pillar type is provided with an outer shape which is angular as a whole. Therefore, when the lamp piece unit is arranged to direct to the front direction of the vehicle in the vehicular headlamp having the surface shape flexed to the rear side, a large space in the depth direction is needed for arranging the lamp piece unit. Therefore, there is a related art problem in that the ability to achieve thin formation of the lamp piece by adopting the semiconductor light emitting element as the light source is reduced.

SUMMARY OF THE INVENTION

The present invention has been carried out in view of the foregoing situation. It is an object of the present invention to provide a vehicular headlamp capable of forming a luminous intensity distribution pattern for a low beam after achieving thin formation of a lamp piece in a vehicular headlamp constituted to form the luminous intensity distribution pattern for a low beam prolonged sideways even when a surface shape thereof is flexed to a rear side by irradiating light from a plurality of lamp piece units each constituting a light source by a semiconductor light emitting element.

However, the present invention need not achieve the above objects, and other objects not described herein may also be achieved. Further, the invention may achieve no disclosed objects without affecting the scope of the invention.

The invention achieves above-described object by adopting a lamp piece unit of a parabolic pillar type as a portion of a plurality of lamp piece units and thereafter devising an arrangement thereof.

The vehicular headlamp according to the invention is characterized in a vehicular headlamp constituted to form a luminous intensity distribution pattern for low beam by irradiating light from a plurality of lamp piece units each constituting a light source by a semiconductor light emitting element, wherein the plurality of lamp piece units comprise at least one front irradiating lamp piece unit arranged to direct in a front direction of a vehicle and at least one side irradiating lamp piece unit arranged to direct to an outer side in a vehicle width direction by a predetermined angle relative to the front direction of the vehicle, and wherein each of the side irradiating lamp piece units comprises a reflector having a reflecting face comprising a curved face in a parabolic pillar shape having a focal line extended in a horizontal direction and the light source comprising at least one semiconductor light emitting element arranged on the focal line and light from the light source is constituted to be diffused and reflected in the horizontal direction by the reflector.

Specific numbers of pieces and arrangement of the "front irradiating lamp piece unit" and the "side irradiating lamp piece unit" are not particularly limited.

A kind of the "semiconductor light emitting element" is not particularly limited but, for example, a light emitting diode, a laser diode or the like can be adopted.

A specific constitution of the "front irradiating lamp piece unit" is not particularly limited so far as a light source is constituted by a semiconductor light emitting element.

A number of pieces of semiconductor light emitting elements constituting the light source and a specific constitution of the reflector of the "side irradiating lamp piece unit" are not particularly limited so far as light from the light source is constituted to diffuse and reflect in the horizontal direction by the reflector having the reflecting face comprising the curved face in the parabolic pillar shape having the focal line extended in the horizontal direction. Further, although a specific inclination angle to the outer side in the vehicle width direction of the "side irradiating lamp piece unit" is not particularly limited, the inclination angle can be set to a value within an angle range of about 10 through 40°.

The present invention has various advantages. As shown by the above-described constitution, the vehicular headlamp according to the invention is constituted to form the luminous intensity distribution pattern for low beam by irradiating light from the plurality of lamp piece units each constituting the light source by the semiconductor light emitting element, as the plurality of lamp piece units, at least one side irradiating lamp piece unit is provided other than at least one front irradiating lamp piece unit, the respective light irradiating lamp piece units are constituted by the lamp piece units of the parabolic pillar type and therefore, the luminous intensity distribution pattern prolonged sideways can be formed by the irradiated light, thereby, the wide diffusing region of the luminous intensity distribution pattern for low beam can easily be formed.

In that case, since the lamp piece unit of the parabolic pillar type is constituted as the side irradiating lamp piece unit, even when the surface shape of the vehicular headlamp is flexed to the rear side, a portion of diffused and reflected light of the reflector can be prevented from being blocked by other lamp piece constituting member.

Further, although the lamp piece unit of the parabolic pillar type is provided with an outer shape which is angular as a whole, the lamp piece unit is constituted for irradiating the side direction and therefore, even when the surface shape of the vehicular headlamp is flexed to the rear side, a large depth space for arranging the lamp piece unit is dispensed with, thereby, an effect of thinning the lamp piece by adopting the semiconductor light emitting element as the light source can be prevented from being reduced.

In this way, according to the invention, in the vehicular headlamp constituted to form the luminous intensity distribution pattern for low beam by irradiating light from the plurality of lamp piece units each constituting the light source by the semiconductor light emitting element, even when the surface shape is flexed to the rear side, the luminous intensity distribution pattern prolonged sideways can be formed after achieving thin formation of the lamp piece.

Further, in the vehicular headlamp according to the invention, the lamp piece unit of the parabolic pillar type is constituted as the side irradiating lamp piece unit and therefore, the luminous intensity distribution pattern prolonged sideways formed by irradiating light from the lamp piece unit is formed at a position shifted to an outer side in the vehicle width direction relative to the front direction of the vehicle. Therefore, when the vehicle is run to turn, the recognizability can be promoted by sufficiently irradiating a front road face in the turning direction by the luminous intensity distribution pattern prolonged sideways.

Further, generally, a pair of vehicular headlamps are provided on both left and right sides of a front end portion of a vehicle and therefore, when the constitution of the invention is applied to the respective lamp pieces, even in turning in either of the left and right directions, the recognizability can be promoted by sufficiently irradiating the front road face in the turning direction.

When the light sources of the respective side irradiating lamp piece units are arranged to direct downwardly and the reflecting face of the reflector is formed on the lower side of the light source in the above-described constitution, when the vehicular headlamp is observed from a skewed upper direction, the light source of the light irradiating lamp piece unit can be prevented from being seen directly. Further, thereby, glare against a driver of a car running on the opposite lane can be prevented and an outlook of the lamp piece by an indirect illuminating effect can be promoted.

Further, in the case in which a plurality of pieces of the side irradiating lamp piece units are arranged to be contiguous to each other in the horizontal direction, when the inclination angles to the outer side in the vehicle width direction of the respective side irradiating lamp piece units are set such that the more the lamp piece unit is disposed to the outer side in the vehicle width direction, to the larger value the inclination angle is set, even when the surface shape of the vehicular headlamp is flexed to the rear side, the respective side irradiating lamp piece units can be arranged to be along the vehicular headlamp flexed to the rear side and thereby, thin formation of the lamp piece can be maintained. Further, diffused luminous intensity distribution patterns formed by irradiating light from the respective side irradiating lamp piece units can be formed to shift from each other in the horizontal direction, thereby, the wide diffusing region of the luminous intensity distribution pattern for low beam can further by widened and a nonuniformity in the luminous intensity distribution can effectively be restrained from being brought about.

Although in the above-described constitution, the specific constitution of the respective front irradiating lamp piece units is not particularly limited as described above, when each of the respective lamp piece units is constituted to include a projecting lens and the reflector for reflecting light from the light source in the front direction on the rear side of the projecting lens and constituted as a lamp piece unit of a so-to-speak projector type in which the reflecting face of the reflector is constituted to substantially converge light from the light source reflected by the reflecting face at a vicinity of a focal point on the rear side of the reflecting lens, a rate of utilizing light flux with respect to light from the light source can sufficiently be increased easily, thereby, a number of the front irradiating lamp piece units can be restrained to be small. Further, by constituting the respective front irradiating lamp piece units by lamp piece units of the projector type having an outer shape rounded as a whole, even when the surface shape of the vehicular headlamp is flexed to the rear side, a larger depth space for arranging the front irradiating lamp piece unit thereby can be prevented from being needed.

Additionally, a vehicular headlamp is provided on at least one side of a front end portion of a vehicle to generate a luminous intensity distribution. The vehicular headlamp includes at least one lamp piece having a plurality of lamp piece units, the plurality of lamp piece units comprising at least one first lamp piece unit configured to irradiate light to a front portion and at least one second lamp piece unit, configured to irradiate light at at least one angle with respect to said front portion. The at least one second lamp piece unit has a reflector with a curved face and a substantially horizontally extending focal line.

BRIEF DESCRIPTION OF THE DRAWINGS

FIG. 11($a$) is a view of a luminous intensity distribution pattern constituting a portion of the luminous intensity distribution pattern for low beam formed by irradiating light from the front irradiating lamp piece unit shown in FIG. 4, and FIG. 11($b$) is a view showing a luminous intensity distribution pattern formed by irradiating light from the front irradiating lamp piece unit shown in FIG. 6.

FIG. 12($a$) is a view showing a luminous intensity distribution pattern constituting another of the luminous intensity distribution pattern for low beam, formed by irradiating light from the side irradiating lamp piece unit shown in FIG. 8, and FIG. 12($b$) is view showing a luminous intensity distribution pattern formed by irradiating light from other light irradiating lamp piece unit.

DETAILED DESCRIPTION OF THE INVENTION

Figure 1:
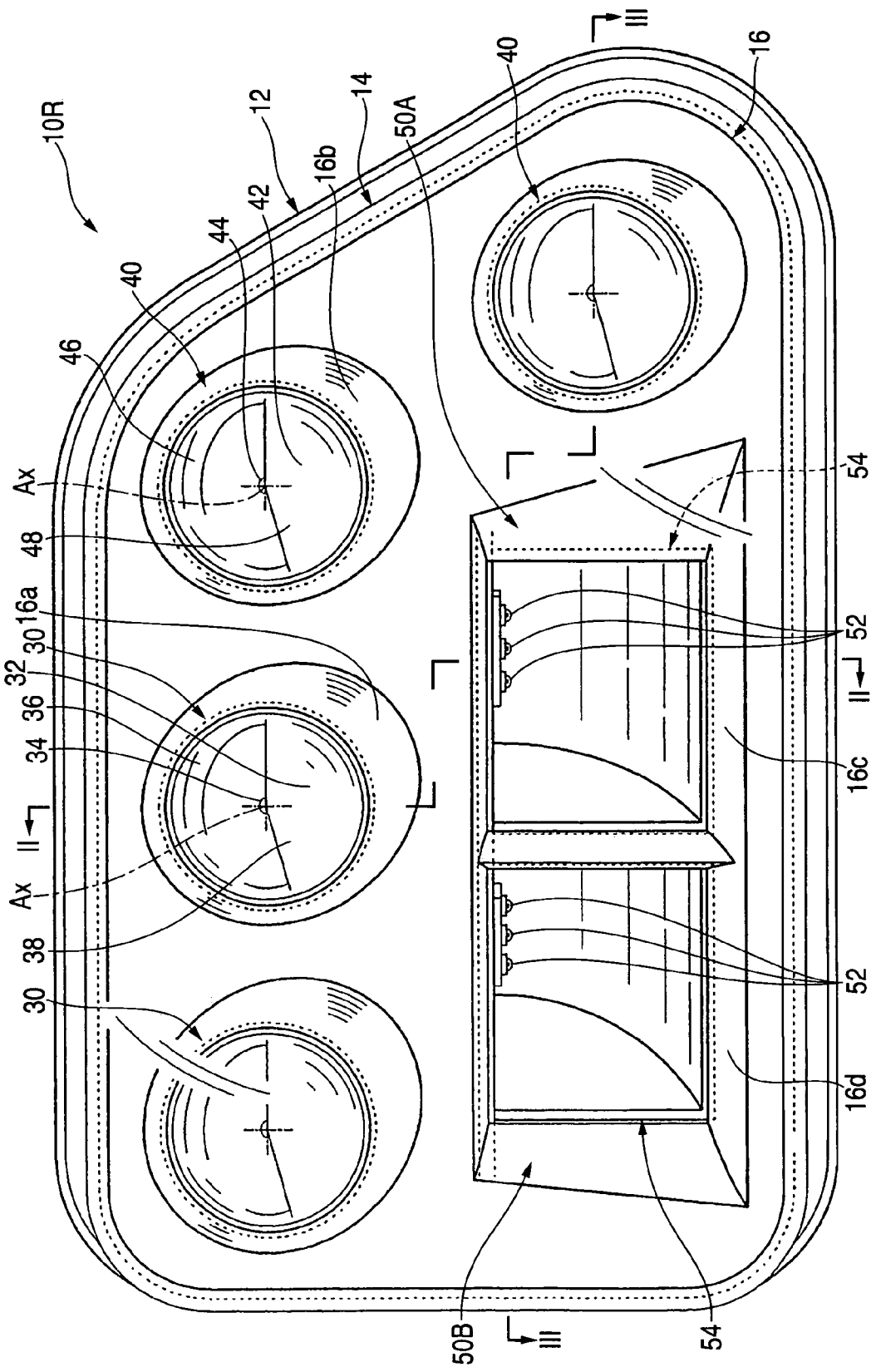
FIG. 1 is a front view showing a vehicular headlamp according to a first exemplary, non-limiting embodiment of the present invention.

An embodiment of the invention will be explained in reference to the drawing as follows.

Figure 2:
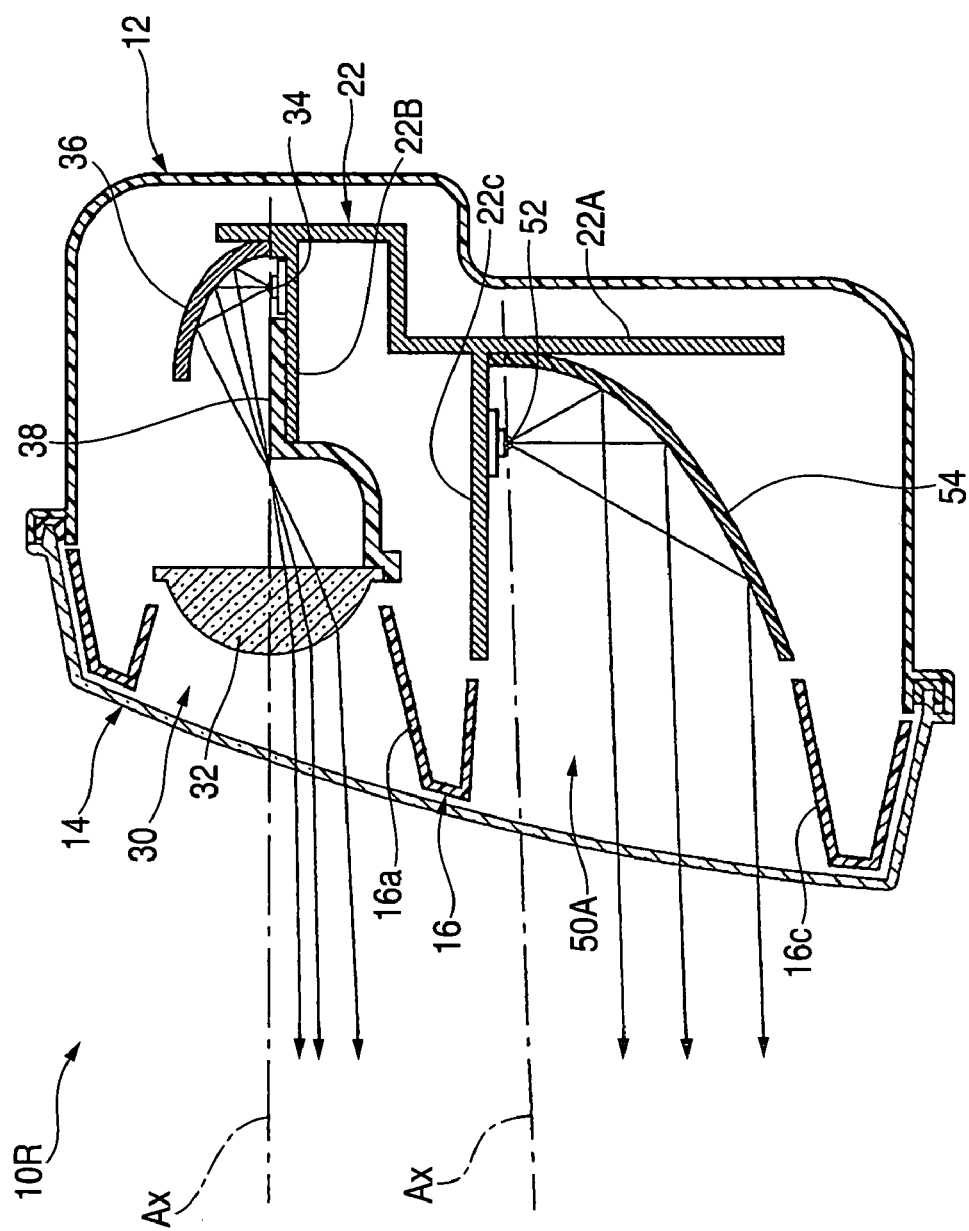
FIG. 2 is a sectional view taken along a line II-II of FIG. 1 according to the first exemplary, non-limiting embodiment of the present invention.
Figure 3:
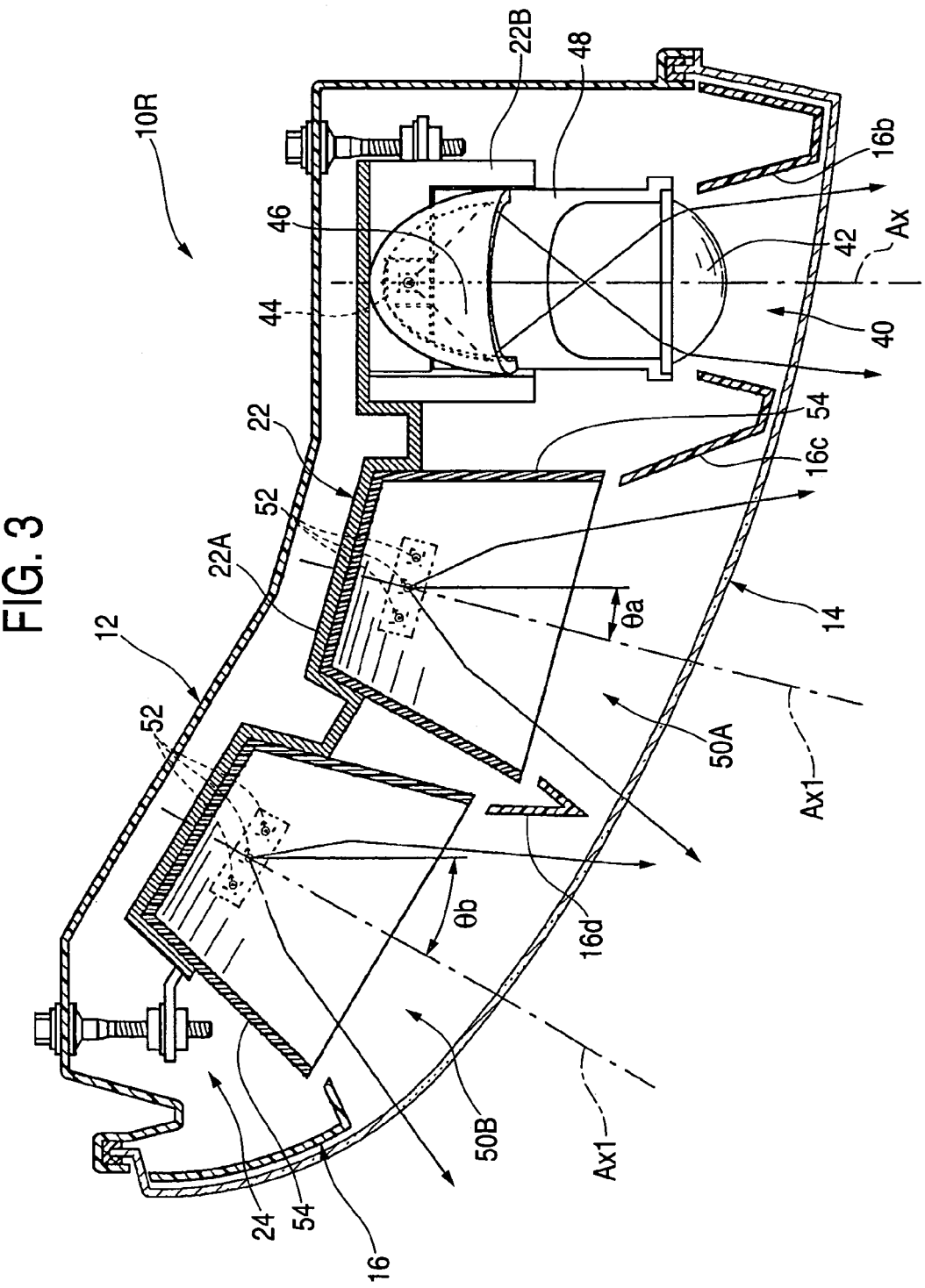
FIG. 3 is a sectional view taken along a line III-III of FIG. 1 according to the first exemplary, non-limiting embodiment of the present invention.

FIG. 1 is a front view showing a vehicular headlamp according to a first exemplary, non-limiting embodiment of the present invention, and FIGS. 2 and 3 are sectional views taken along lines II-II and III-III of FIG. 1, respectively.

A vehicular headlamp 10R according to the first exemplary, non-limiting embodiment of the present invention is a lamp piece provided on a right side (e.g., a side nearest to an opposed lane) of a front end portion of the vehicle constituted to contain six of lamp piece units 30, 40, 50A, 50B by arranging threes thereof in two upper and lower stages inside a lamp chamber formed by a lamp body 12 and a transparent light transmitting cover 14 attached to an opening portion of a front end thereof. Further, a luminous intensity distribution pattern for a low beam is formed by irradiating light from the six lamp piece units 30, 40, 50A, 50B in the vehicular headlamp 10R. While six pieces are used in this embodiment, the present invention is not limited thereto, and other numbers of pieces may be used.

The respective lamp piece units 30, 40, 50A, 50B are supported by the lamp body 12 via an aiming mechanism 24 inclinably in an up and down direction and a left and right direction while in a state of being fixed to a support bracket 22. The support bracket 22 is made by diecasting, and includes a vertical panel portion 22A and unit support portions 22B, 22C extended from the vertical panel portion 22A to a front side in a shelf-like shape at a plurality of portions thereof.

The light transmitting cover 14 is formed to be flexed to the rear side in a widthwise vehicle direction from an inner side to an outer side of the vehicle. Further, inside the lamp chamber, an inner panel 16 is provided along the light transmitting cover 14 and cylindrical opening portions 16$a$, 16$b$, 16$c$, 16$d$ are respectively formed at positions of the inner panel 16 in correspondence with the respective lamp piece units 30, 40, 50A, 50B to surround. Further, the cylindrical opening portion 16$c$ and the cylindrical opening portion 16$d$ are formed to be substantially continuous with each other.

In the six lamp piece units 30, 40, 50A, 50B, two of the lamp piece units 30 disposed at a center of the upper stage and an outer side thereof in the vehicle width direction as well as two of the lamp piece units 40 disposed at end portions on inner sides in the vehicle width direction of the respective upper and lower stages are arranged to direct to the front direction of the vehicle as the lamp piece units for irradiating the front side. The remaining two of the lamp piece units 50A, 50B at the lower stage are arranged to direct to outer sides in the vehicle width direction relative to the front direction of the vehicle by angles as the lamp piece units for irradiating the side.

With regard to angles of inclination of the two side irradiating lamp piece units 50A, 50B to the outer side in the width direction, the angle of inclination of the lamp piece unit 50B disposed on the outer side in the vehicle width direction is set to be a larger value. Specifically, the angle of inclination θa to the side of an optical axis Ax 1 of the lamp piece unit 50A is about 15° and the angle inclination θb to the side of a center axis Ax 1 of the lamp piece unit 50B is about 30°. However, the present invention is not limited thereto, and other angles may be substituted therefor.

Further, according to the vehicular headlamp 10R of the embodiment, an optical axis is adjusted such that an optical axis Ax of the front irradiating lamp piece units 30, 40 is directed downwardly by about 0.5 to 0.6°, relative to the front and rear direction of the vehicle.

Next, specific constitutions of the respective lamp piece units 30, 40, 50A, 50B will be explained, beginning with the front irradiating lamp piece units 30, 40.

Figure 4:
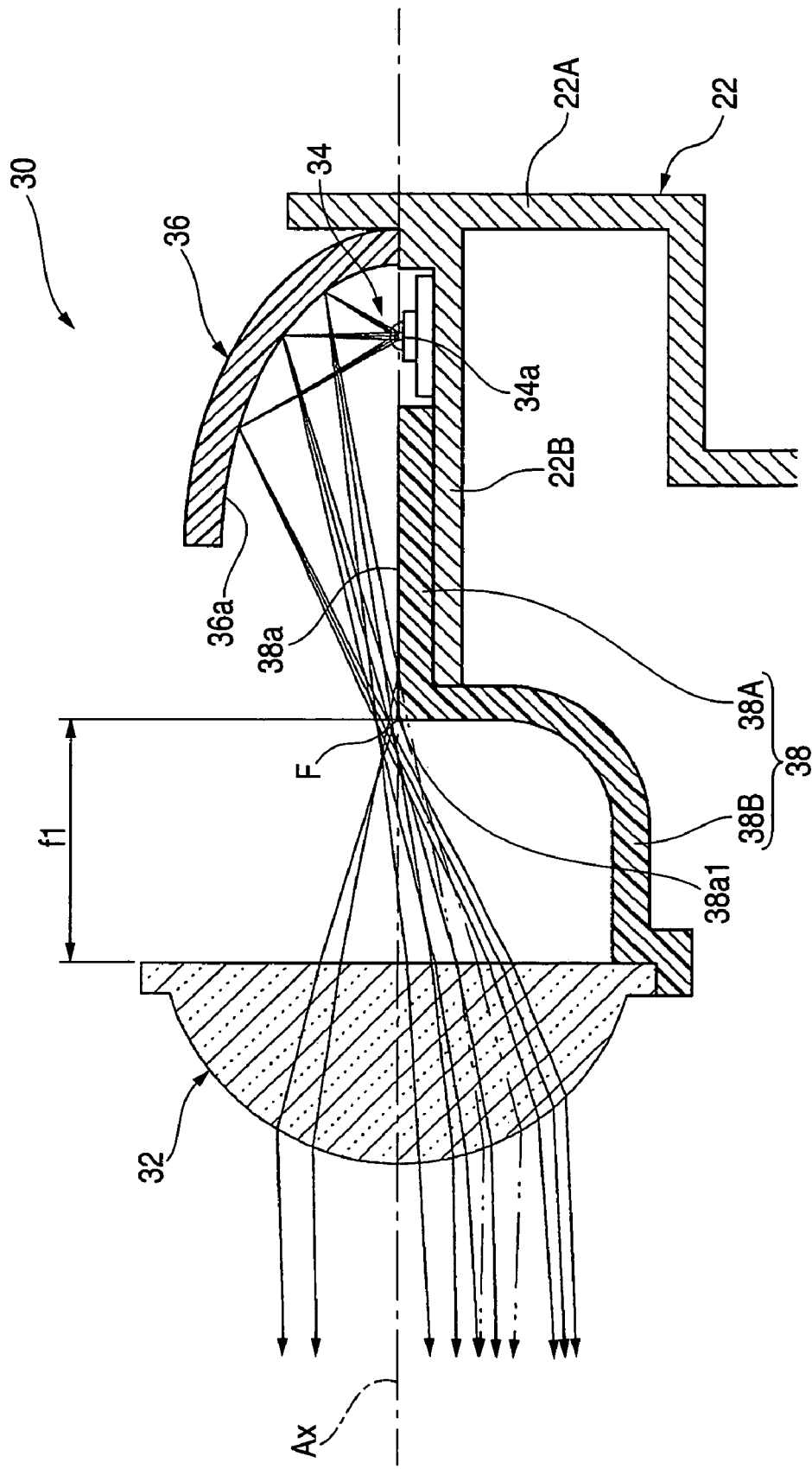
FIG. 4 is a side sectional view of one of a plurality of front irradiating lamp piece units constituting a vehicular headlamp according to the first exemplary, non-limiting embodiment of the present invention.
Figure 5:
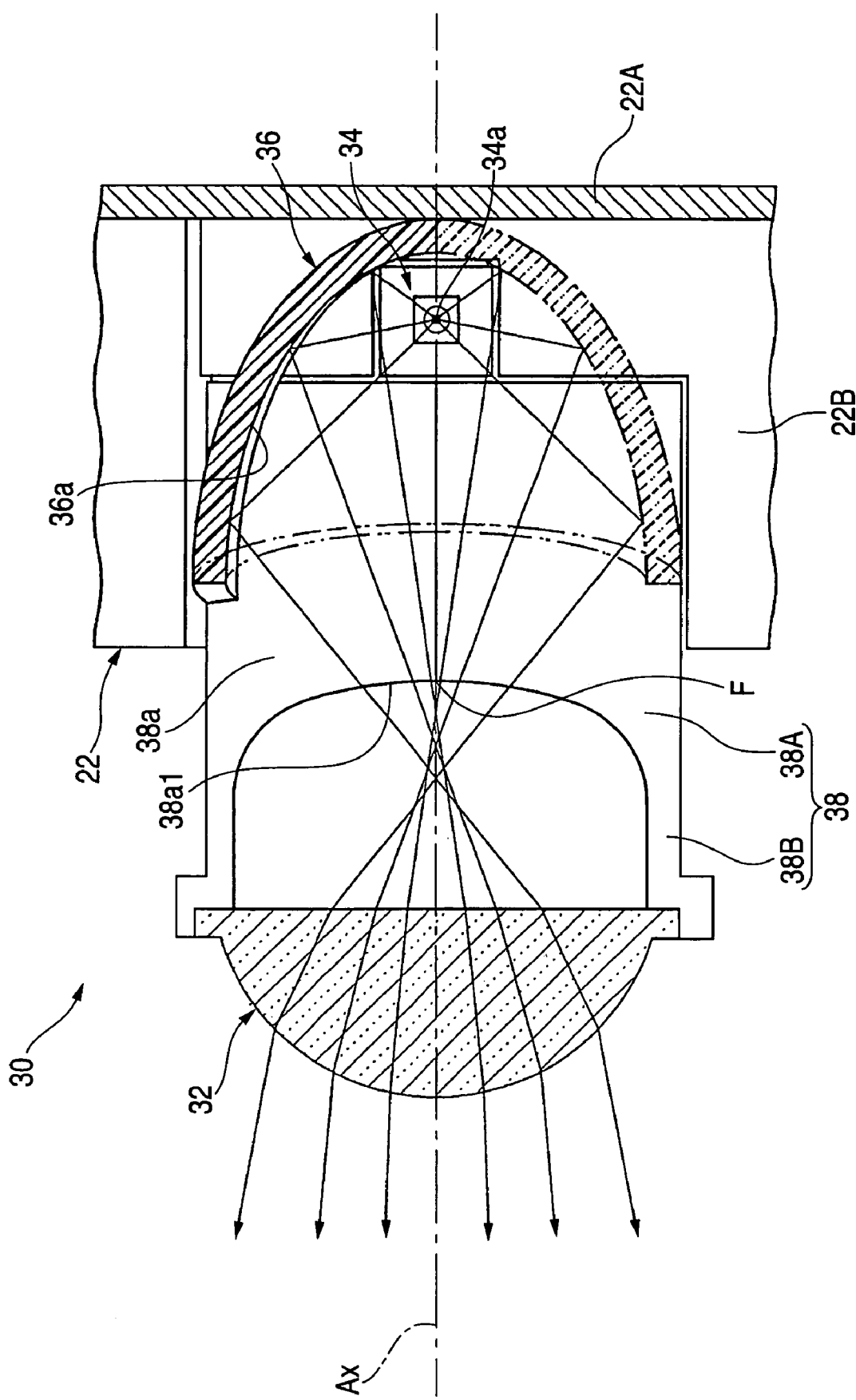
FIG. 5 is a plane sectional view of the front irradiating lamp piece unit shown in FIG. 4, according to the first exemplary, non-limiting embodiment of the present invention.

FIGS. 4 and 5 are a side sectional view and a plane sectional view showing details of one of the two front irradiating lamp pieces 30. The front irradiating lamp piece unit 30 is a lamp piece unit of a projector type and is constituted by providing a projecting lens 32 arranged on the optical axis Ax extending in the front-rear direction of the vehicle, a semiconductor light emitting element 34 arranged on a rear side of the projecting lens 32, a reflector 36 arranged to cover the semiconductor light emitting element 34 from an upper side, and a light control member 38 arranged between the semiconductor light emitting element 34 and the projecting lens 32.

The projecting lens 32 includes a flat convex lens, a front side surface of which is convex and a rear side surface of which is flat, and a focal length f1 is set to a comparatively short value.

The semiconductor light emitting element 34 is white light emitting diode having a light emitting chip 34a having a size of about 0.3 through 1 mm square and is fixed to the unit support portion 22B of the support bracket 22 in a state in which the light emitting chip 34a is arranged upwardly in a vertical direction on the optical axis Ax.

The reflector 36 is constituted to reflect light from the semiconductor light emitting element 34 forwardly to a side of the optical axis Ax to substantially converge to a vicinity of a focal point F on a rear side of the projecting lens 32. Specifically, a sectional shape including the optical axis Ax of a reflecting face 36a of the reflector 36 is set to substantially an elliptical shape, and an eccentricity thereof is set to gradually increase from a vertical section to a horizontal section. Further, according to the reflecting face 36a, light from the semiconductor light emitting element 34 is converged substantially to a position slightly frontward from the rear side focal point F. The reflector 36 is fixed to the unit support portion 22B of the support bracket 22 at a lower end portion of a peripheral edge thereof.

The light control member 38 comprises the light control portion 38A formed substantially in an angle-like shape in a front view of the lamp piece, and a lens holder portion 38B formed to extend from a front end portion of the light control portion 38A to a front side.

An upper face 38a of the light control portion 38A extends from the focal point F on the rear side of the projecting lens 32 to a rear side, a region thereof on a left side of the optical axis Ax (right side in front view of lamp piece) is constituted by a plane extended horizontally from the optical axis Ax in a left direction, and a region thereof on a right side of the optical axis Ax is constituted by a plane extended from the optical axis Ax in a right direction and in a skewed lower direction (for example, in a lower direction by about 15°).

A front end edge 38a1 of the upper face 38a is formed substantially in a shape of a circular arc along a focal face of the focal point F on the rear side of the projecting lens 32. The upper face 38a is subjected to a reflecting face treatment by aluminum vapor deposition or the like to thereby constitute the upper face 38a as a reflecting face. The light control portion 38A blocks linear advancement of a portion of reflected light from the reflecting face 36a of the reflector 36 to reflect in an upper direction at the upper face 38a. Further, the light control portion 38A is fixed to the unit support portion 22B of the support bracket 22 at a lower face thereof.

The lens holder portion 38B is extended to a front side to bend to a lower side from the front end portion of the light control portion 38A to support the projecting lens 32 at a front end portion thereof.

Figure 6:
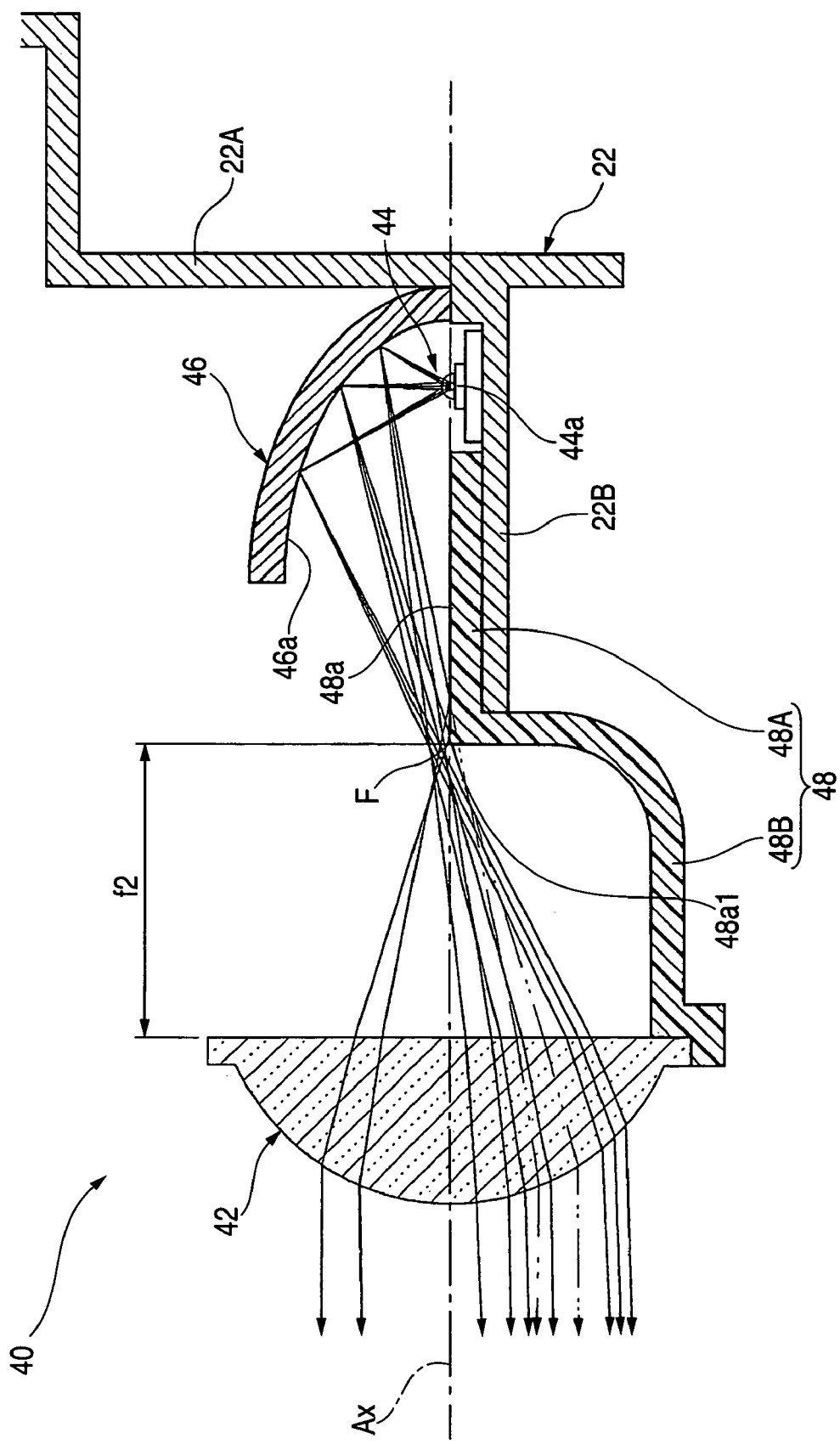
FIG. 6 is a side sectional view showing details of another of the plurality of front irradiating lamp piece units according to the first exemplary, non-limiting embodiment of the present invention.
Figure 7:
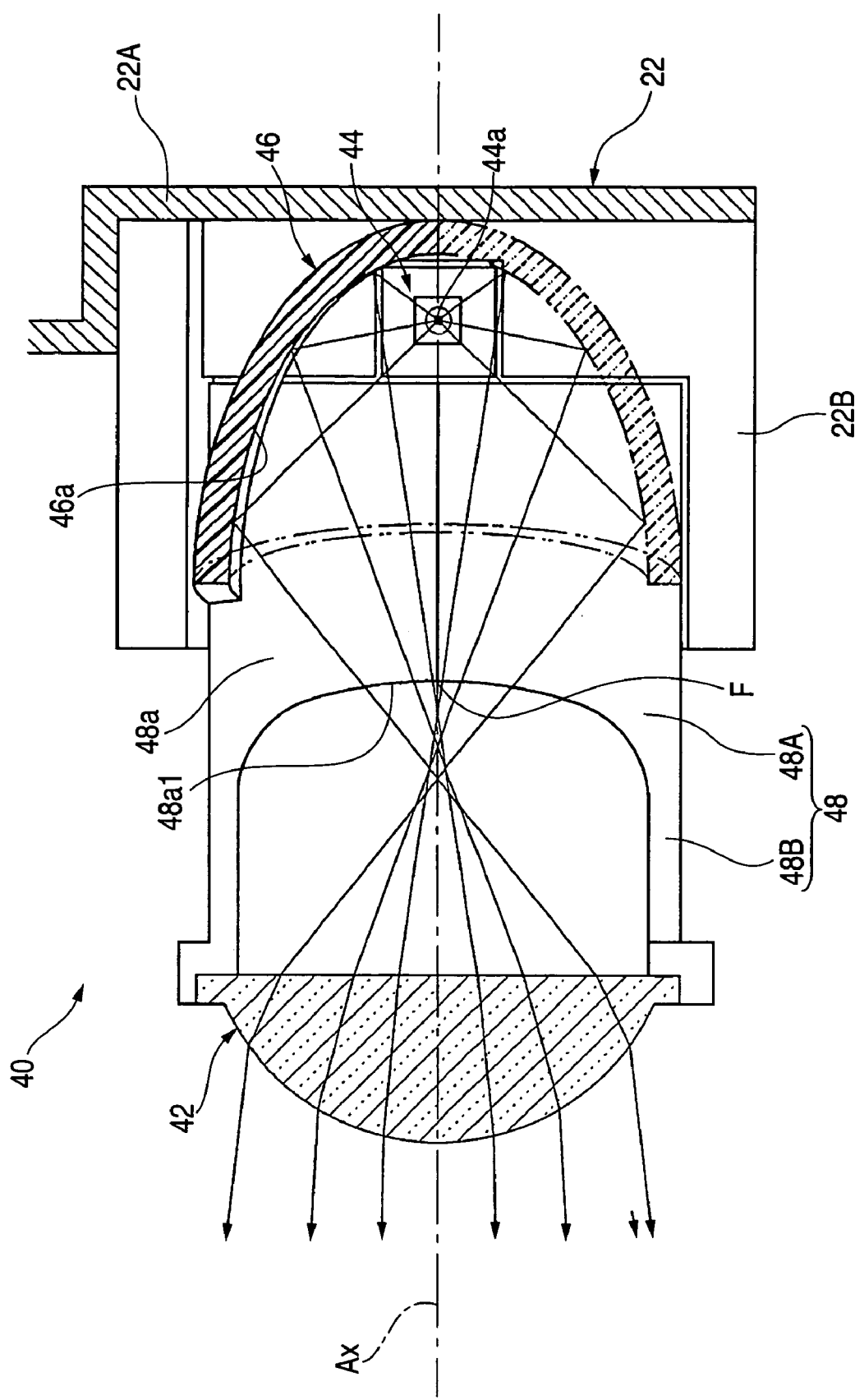
FIG. 7 is a plane sectional view showing the front irradiating lamp piece unit shown in FIG. 6, according to the first exemplary, non-limiting embodiment of the present invention.

FIGS. 6 and 7 are a side sectional view and a plane sectional view showing details of one of remaining two of the front irradiating lamp piece units 40.

As shown by the drawing, the front irradiating lamp piece unit 40 is of a projector type and constitutions of a semiconductor light emitting element 44 and a reflector 46 thereof are quite similar to those of the semiconductor light emitting element 34 and the reflector 36 of the front irradiating lamp piece unit 30 and also a projecting lens 42 and a light control member 48 are quite similar to the projecting lens 42 and the light control member 38 of the front irradiating lamp piece unit 30, except for the following point described below.

A focal length f2 of the projecting lens 42 is set to a value larger than the focal length f1 of the projecting lens 32 of the lamp piece unit 30. In correspondence therewith, a length in the front and rear direction of the lens holder portion 48B of the light control member 48 is set to a value larger than that of the lens holder portion 38B of the lamp piece unit 30.

Figure 8:
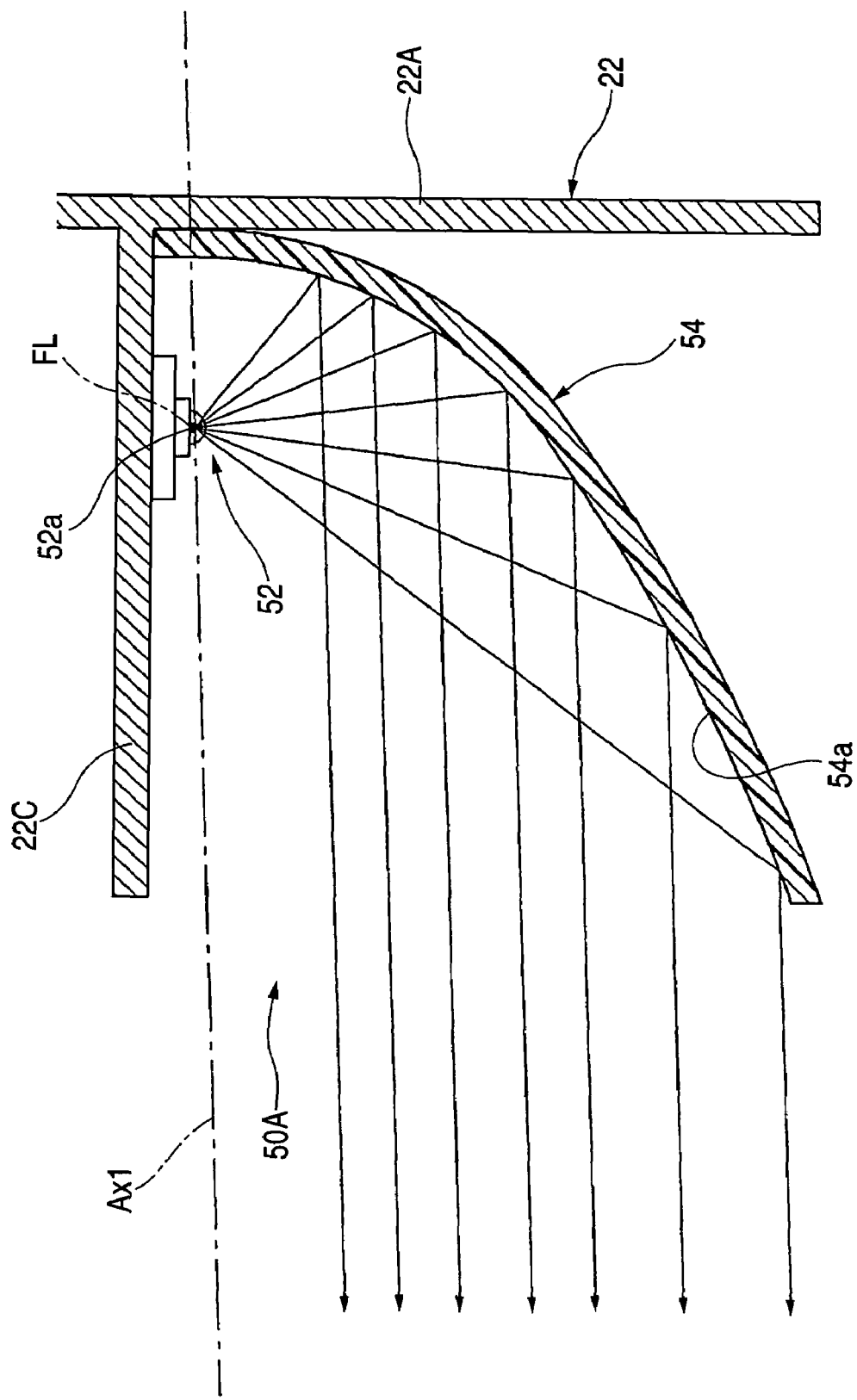
FIG. 8 is a side sectional view of one of a plurality of side irradiating lamp piece units constituting the vehicular headlamp according to the first exemplary, non-limiting embodiment of the present invention.
Figure 9:
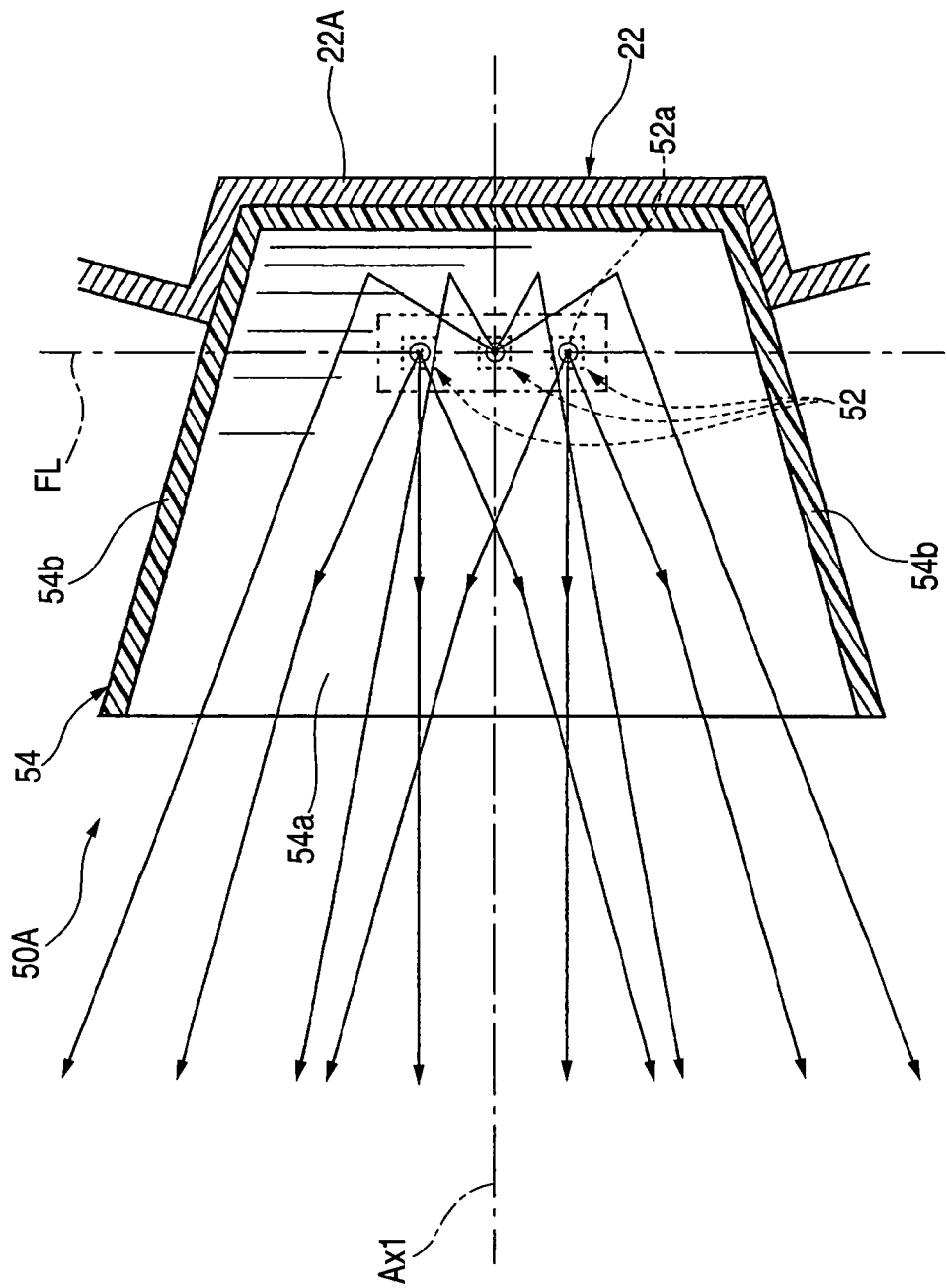
FIG. 9 is a plane sectional view of the side irradiating lamp piece units shown in FIG. 1, according to the first exemplary, non-limiting embodiment of the present invention.

Next, specific constitutions of the side irradiating lamp piece units 50A, 50B will be explained. FIGS. 8 and 9 are a side sectional view and a plane sectional view showing details of the side irradiating lamp piece unit 50A disposed on the inner side in the vehicle width direction.

As shown by the drawings, the side irradiating lamp piece unit 50A is of a parabolic pillar type and is constituted by providing three semiconductor light emitting elements 52 constituting light source and a reflector 54 arranged on a lower side of the semiconductor light emitting elements 52. However, the present invention is not limited to this number or configuration, and any other configuration as would be known by those of ordinary skill in the art may be used.

The reflector 54 includes a reflecting face 54a comprising a curved face in a parabolic pillar shape having a focal line FL extended in a horizontal direction. A pair of side walls 54b are formed on both sides of the reflecting face 54a. In this case, the focal line FL is set to extend in a direction orthogonal to the unit center axis Ax 1 of the light irradiating lamp piece unit 50A.

The unit center axis Ax 1 is an axis of a parabola constituting a vertical section of the curved face in the parabolic pillar shape, and is set to extend slightly downwardly in a direction of being inclined to an outer side in the vehicle width direction by the side inclination angle of θa relative to the vehicle front direction as described above. Further, the pair of side walls 54b are formed as vertical walls having a shape that is substantially symmetric in the left and right direction with respect to the unit center axis center Ax 1 and expanded to a front side.

Three of the semiconductor light emitting elements 52 are fixed to the unit support portion 22C of the support bracket 22 in a state of being arranged along the focal line FL at predetermined intervals. In that case, the semiconductor light emitting element 52 disposed at center is disposed on the unit center axis Ax 1 and the semiconductor light emitting elements 52 are disposed on both sides thereof arranged at positions symmetrical with each other with respect to the unit center axis Ax 1. Each of the semiconductor light emitting elements 52 is a white light emitting diode (or equivalent thereof as would be understood by one of ordinary skill in the art) having a light emitting chip 52a having a size of about 0.3 through 1 mm square and the light emitting chip 52a is arranged to direct downwardly in a vertical line on the focal line FL.

Further, the light irradiating lamp piece unit 50A reflects light from the three semiconductor light emitting elements 52 in the direction inclined to the outer side in the vehicle width direction by the side inclination angel θa relative to the vehicle front direction by the reflector 54.

In this configuration, the reflected light from the reflector 54 becomes parallel light directed slightly downwardly with respect to the up and down direction and becomes light significantly diffusing to the both left and right sides centering on the unit center axis Ax 1 with respect to the left and right direction since the reflecting face 54a is constituted by the curved face in the parabolic pillar shape directed slightly downwardly.

Meanwhile, the side irradiating lamp piece unit 50B disposed on the outer side in the vehicle width direction is arranged by a side inclination angle different from that of the side irradiating lamp piece unit 50A. However, the constitution is substantially similar to that of the side irradiating lamp piece unit 50A as described above. Further, the side irradiating lamp piece unit 50B reflects light from the three semiconductor light emitting elements 52 from the vehicle front direction to a direction of being inclined to the outer side in the vehicle width direction by the side inclination angle of θb by the reflector 54.

Figure 10:
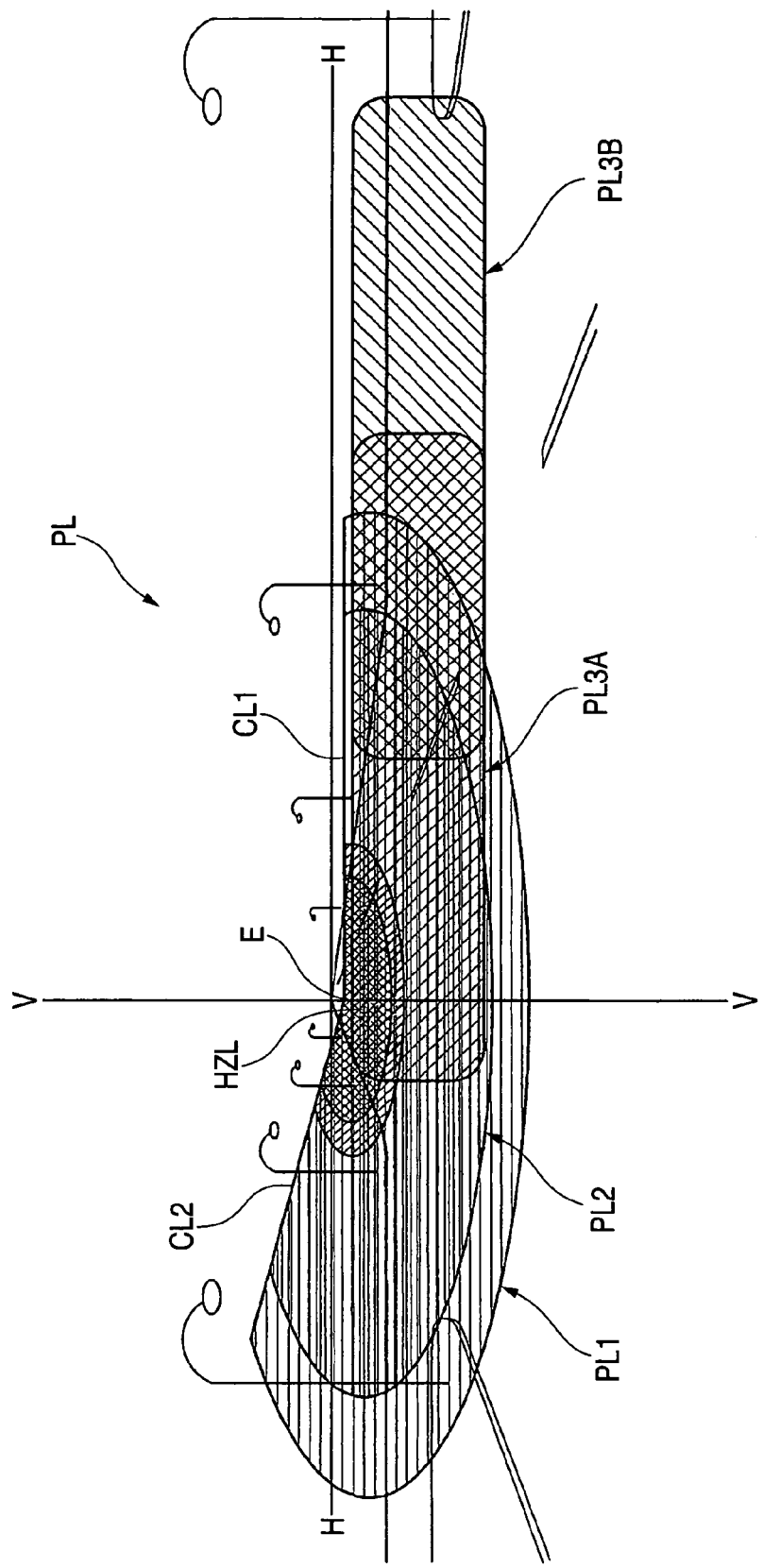
FIG. 10 is a perspective view of a luminous intensity distribution pattern for low beam formed on an imaginary vertical screen placed 25 m frontward from a lamp piece by light irradiated in the front direction from the vehicular headlamp according to the first exemplary, non-limiting embodiment of the present invention.

FIG. 10 is a view perspectively showing a luminous intensity distribution pattern for low beam formed on an imaginary vertical screen arranged at about 25 m frontward from the lamp piece by light irradiated from the vehicular headlamp 10R according to the first exemplary, non-limiting embodiment in the front direction.

The luminous intensity distribution pattern PL for low beam is a left luminous intensity distribution including a horizontal cutoff line CL 1 and a skewed cutoff line CL 2 rising from the horizontal cutoff line CL 1 by a predetermined angle (for example, about 15°) at an upper end edge thereof, and a position of an elbow point E constituting an intersection of the two cutoff lines CL 1, CL 2 is set to a position downward from H-V, which is the focal point in the front direction of the lamp piece, by about 0.5 through 0.6°. The luminous intensity distribution pattern PL for the low beam is formed with a hot zone HZL constituting a high luminous intensity region to surround the elbow point E. The luminous intensity distribution pattern PL for the low beam includes a wide diffusing region extended to a right side direction.

The luminous intensity distribution pattern PL for the low beam is formed as a luminous intensity distribution pattern synthesized with two of light intensity distribution patterns PL 1 formed by irradiating light from two of the front irradiating lamp piece units 30, two of light intensity distribution patterns PL 2 formed by irradiating light from two of the front irradiating lamp piece units 40, and two of luminous intensity distribution patterns PL 3A, PL 3B formed by irradiating light from two of the side irradiating lamp piece units 50A, 50B.

As shown in FIG. 11(a), in the luminous intensity distribution pattern PL 1 formed by irradiating light from the front irradiating lamp piece unit 30, the horizontal and skewed cutoff lines CL 1, CL 2 are formed as an inversely projected image of the front edge 38a1 of the upper face 38a of the light control member 38. At this occasion, the upper face 38a of the light control member 38 is constituted as the reflecting face and therefore, as shown by two-dotted chain lines in FIG. 4, also light in the reflected light from the reflecting face 36a of the reflector 36 which is to be emitted upwardly from the projecting lens 32 is utilized as light emitted downwardly from the projecting lens 32 as shown by bold lines in the drawing by reflecting operation of the upper face 48a. Further, thereby, not only is a rate of utilizing a light flux of light emitted from the semiconductor light emitting element 34 increased, but also the hot zone HZL 1 is formed.

Further, as shown in FIG. 11(b), in a luminous intensity distribution pattern PL 2 formed by irradiating light from the front irradiating lamp piece unit 40, the horizontal and skewed cutoff lines CL 1, CL 2 are formed as an inversely projected image of the front end edge 48a of the upper face 48a of the light control member 48. At this occasion, the upper face 48a of the light control member 48 is constituted as a reflecting face and therefore, as shown by two-dotted chain lines in FIG. 6, light in the reflected light from the reflecting face 46a of the reflector 46 which is to be emitted upwardly from the projecting lens 42 is also utilized as light emitted downwardly from the projecting lens 42 as shown by bold lines in the drawing by reflecting operation of the upper face 48a. Further, thereby, not only is the rate of utilizing the light flux of emitted light from the semiconductor light emitting element 44 increased, but also a hot zone HZL 2 is formed.

The luminous intensity distribution pattern PL 2 is smaller and brighter than the luminous intensity distribution pattern PL 2 since the focal length f2 of the projecting lens 42 is set to the value larger than the focal length f1 of the projecting lens 32. Also the hot zone HZL 2 is smaller and brighter than the hot zone HZL 1 of the luminous intensity distribution pattern PL 1.

As shown in FIG. 12(a), a luminous intensity distribution pattern PL 3A formed is by irradiating light from the side irradiating lamp piece unit 50A. This patter PL 3A becomes a luminous intensity distribution pattern prolonged extending sideways from a center position of the luminous intensity distribution pattern PL for the low beam to a slightly right side position of a right side end edge thereof at a vicinity of a lower side of the horizontal cutoff line CL 1. In this case, the amount of shifting of the luminous intensity distribution pattern PL 3A to the right side corresponds to the side inclination angle θa of the side irradiating lamp piece unit 50A.

The luminous intensity distribution pattern PL 3A is formed as the luminous intensity distribution pattern prolonged sideways, since the reflecting face 54a of the reflector 54 is constituted by the curved face in the parabolic pillar shape. The luminous intensity distribution pattern PL 3A is formed at a vicinity of the lower side of the horizontal cutoff line CL 1 since the reflector 54 is directed slightly downwardly.

As shown in FIG. 12(b), a luminous intensity distribution pattern PL 3B becomes a luminous intensity distribution pattern prolonged sideways and extending from a right side end edge of the luminous intensity distribution pattern PL for low beam to partially overlap with the luminous intensity distribution pattern PL 3A at a vicinity of a lower side of the horizontal cutoff line CL 1. In this case, the amount of shifting of the luminous intensity distribution pattern PL 3A to the right side corresponds to the side inclination angle θb of the side illuminating lamp piece unit 50B.

As described above, according to the first embodiment, the luminous intensity distribution pattern PL for low beam is formed by irradiating light from the six lamp piece units 30, 40, 50A, 50B constituting light sources of the semiconductor light emitting elements. Of the six lamp piece units, other than the four front irradiating lamp piece units 30, 40, two side irradiating lamp piece units 50A, 50B are provided. The respective side irradiating lamp piece units 50A, 50B are constituted as the lamp piece units of the parabolic pillar type. Therefore, the luminous intensity distribution patterns PL 3A, PL 3B that are prolonged sideways can be formed by irradiated light thereof to enable easy formation of the wide diffusing region of the luminous intensity distribution pattern PL for the low beam.

In this case, the lamp piece units 50A, 50B of the parabolic pillar type are constituted as the side irradiating lamp piece units. Therefore, when the surface shape of the vehicular headlamp 10R is flexed to the rear side as in the first embodiment, a portion of diffused and reflected light from the reflector 54 can be prevented from being blocked by the other lamp piece members.

Further, the lamp piece units 50A, 50B of the parabolic pillar type have an outer shape that is angular as a whole and constituted as the side irradiating lamp piece units. Even when the surface shape of the vehicular headlamp 10R is flexed to the rear side as in the first embodiment, a large depth space for arranging the lamp piece units 50A, 50B is provided so as to enable prevention of the effect of thin formation of the lamp piece, by adopting the semiconductor light emitting element, as the light source is prevented from being reduced.

In this way, although the surface shape of the vehicular headlamp 10R is flexed to the rear side, the luminous intensity distribution patterns PL 3A, PL 3B prolonged sideways can be formed after achieving thin formation of the lamp piece.

In the vehicular headlamp 10R according to the embodiment, the lamp piece units 50A, 50B of the parabolic pillar type are constituted as the side irradiating lamp piece units. Therefore, the luminous intensity distribution patterns PL 3A, PL 3B prolonged sideways formed by irradiating light from the lamp piece units 50A, 50B are formed at positions shifted to the right side relative to the front direction of the vehicle. When the vehicle turns in a right direction, better recognizability can be promoted by sufficiently irradiating a road face in front of the turning direction, via the luminous intensity distribution patterns PL 3A, PL 3B, which is prolonged sideways.

In the vehicular headlamp 10R according to the first embodiment, the three semiconductor light emitting elements 52 constituting the light source of each of the light irradiating lamp piece units 50A, 50B is directed downward, and the reflecting face 54a of the reflector 54 is formed on the lower side of the three semiconductor light emitting elements 52. Therefore, when the vehicular headlamp 10R is observed from a skewed upper direction, the light sources 52 of the side irradiating lamp piece units 50A, 50B can be prevented from being seen directly through the light transmitting cover 14. Further, glare against the driver of a car running on the opposite lane can be prevented and outlook of the lamp piece by an indirectly illuminating effect can be promoted.

Since the light source of each of the side irradiating lamp piece units 50A, 50B is constituted by the three semiconductor light emitting elements 52, the luminous intensity distribution patterns PL 1, PL 2 formed by irradiating light from the respective side irradiating lamp piece units 50A, 50B can be made sufficiently bright. Further, a number of the side irradiating lamp piece units can be restrained to a small size.

In the vehicular headlamp 10R according to the first embodiment, the two side irradiating lamp piece units 50A, 50B are arranged contiguous with respect to each other in the horizontal direction. Also, the inclination angle to the outer side in the vehicle width direction of the lamp piece unit 50B disposed on the outer side in the vehicle width direction is set to be a value higher than that of the lamp piece unit 50A disposed on the inner side in the vehicle width direction. Therefore, the respective light irradiating lamp piece units 50A, 50B can be arranged along the surface shape of the vehicular headlamp 10R flexed rearwardly, and thin formation of the lamp piece can be maintained.

In such a case, the diffused luminous intensity distribution patterns PL 3A, PL 3B formed by irradiating light from the respective side irradiating lamp piece units 50A, 50B are formed to shift from each other in the horizontal direction. Therefore, the wide diffusing region of the luminous intensity distribution pattern PL for low beam can further be widened and nonuniformity in the luminous intensity distribution can be substantially restrained.

Further, in the vehicular headlamp 10R according to the embodiment, the respective front irradiating lamp piece units 30, 40 are constituted as the lamp piece units of the projector type. Therefore, the rate of utilizing the light flux with respect to light from the semiconductor light emitting elements 34, 44 constituting the light sources can be sufficiently increased easily. As a result, a number of the front irradiating lamp piece units can be restrained to be a small size.

Further, by constituting the respective front irradiating lamp piece units 30, 40 as lamp piece units of the projector type having the outer shape rounded as a whole, even when the surface shape of the vehicular headlamp 10R is flexed to the rear side as in the first embodiment, the large depth space for arranging the front irradiating lamp piece units 30, 40 thereby can be substantially prevented from being needed.

In that case, as the front irradiating lamp piece units, 30, 40, two kinds of the lamp piece units having different focal lengths F1, F2 of the projecting lenses 32, 42 are used. Therefore, the luminous intensity distribution patterns PL 1, PL 2 of two kinds having different sizes can be formed. As a result, the luminous intensity distribution pattern PL for low beam can be provided with a smooth luminous intensity distribution having a small nonuniformity of luminous intensity distribution.

Figure 13:
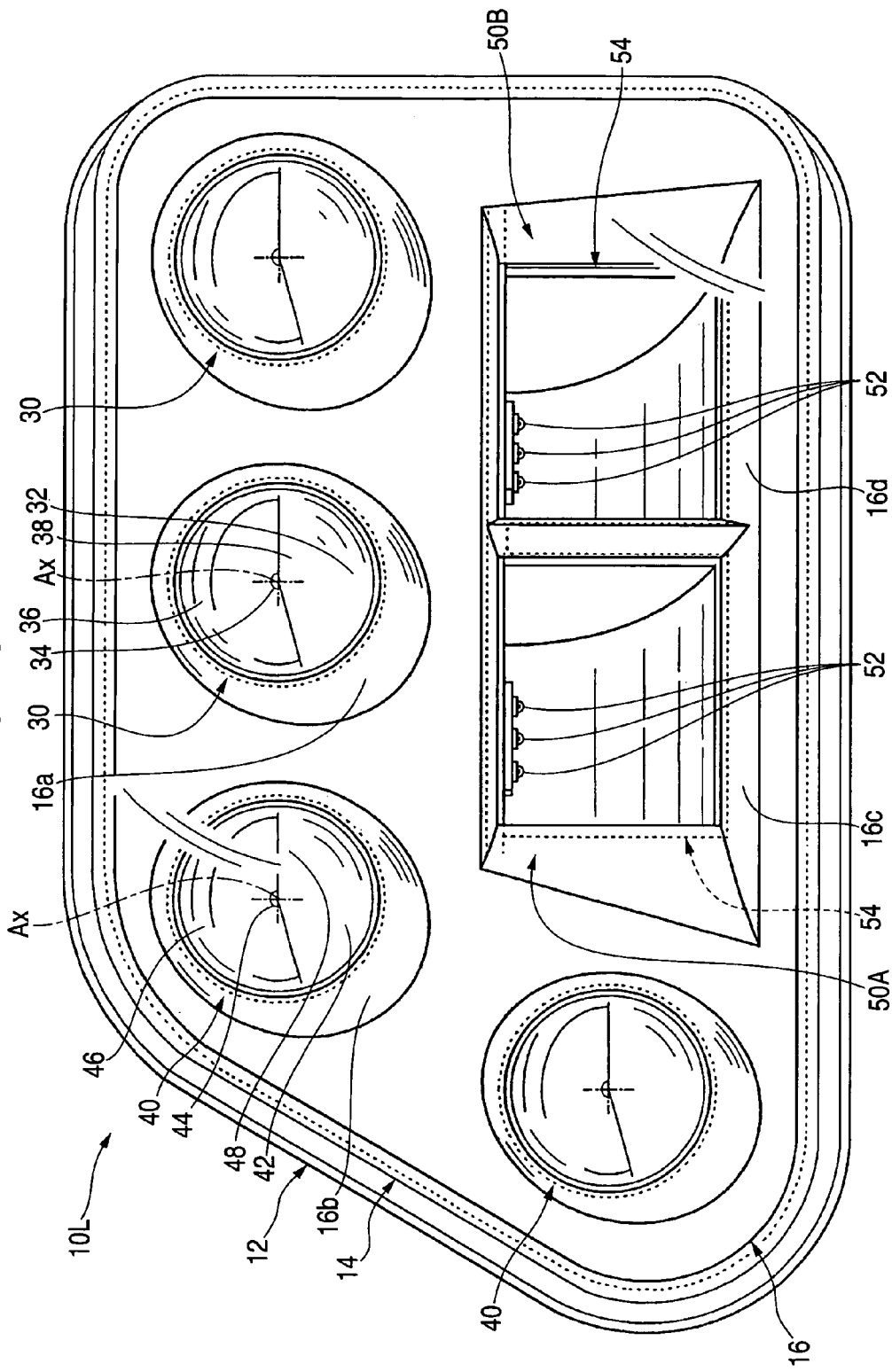
FIG. 13 is a front view showing a vehicular headlamp according to a second exemplary, non-limiting embodiment of the present invention.

A second exemplary, non-limiting embodiment of the present invention will now be explained. FIG. 13 is a front view showing a vehicular headlamp according to the second exemplary, non-limiting embodiment of the present invention.

A vehicular headlamp 10L is a lamp piece provided on a left side of a front end portion of a vehicle, (e.g., road shoulder side in Japan and road center part in the United States) and although a number of constituent elements are arranged in a positional relationship symmetric with constituent elements of the vehicular headlamp 10R including the side irradiating lamp piece units 50A, 50B in the left and right direction, with regard to the front irradiating lamp piece units 30, 40, constituent elements thereof are arranged in a positional relationship moving constituent elements of the vehicular headlamp 10R in a parallel direction.

Figure 14:
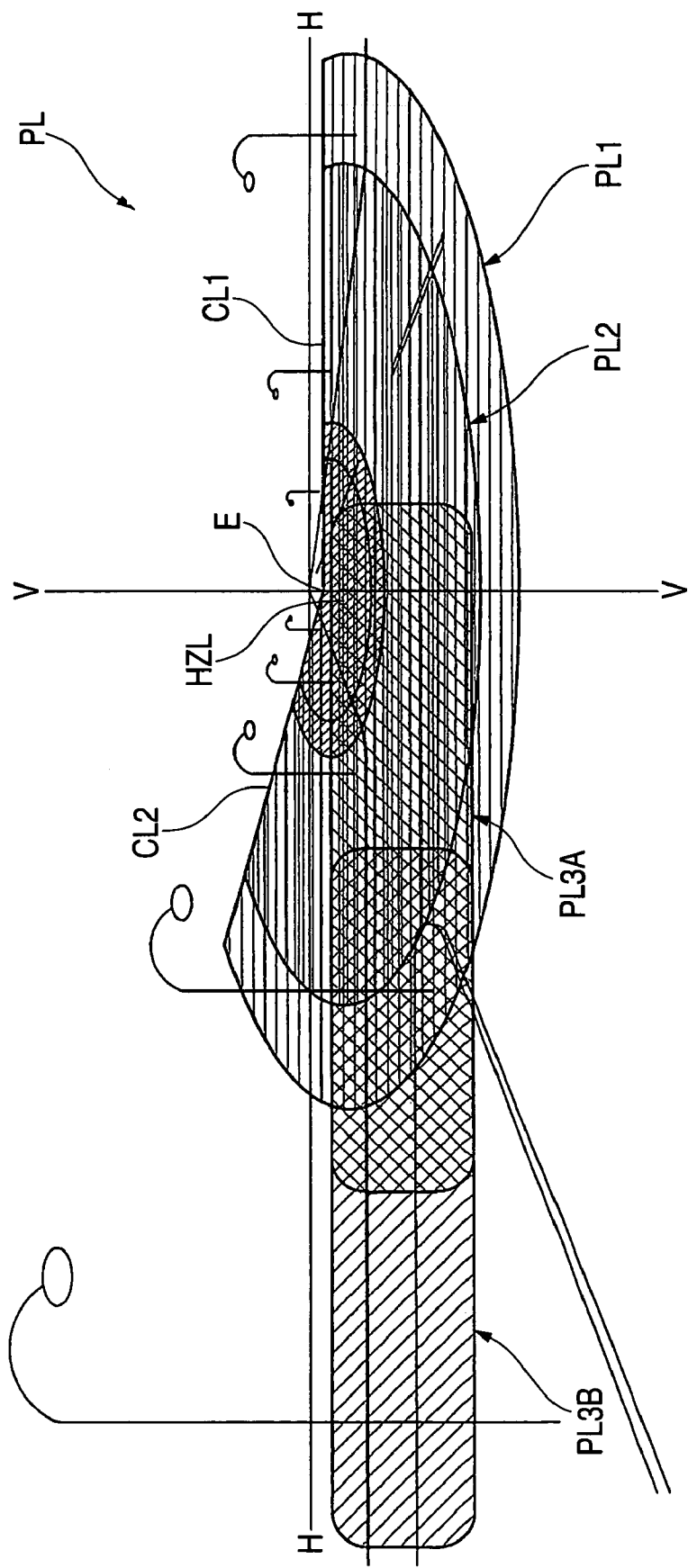
FIG. 14 is a perspective view showing a luminous intensity distribution pattern for low beam formed on the imaginary vertical screen by light irradiated in the front direction from the vehicular headlamp according to the second exemplary, non-limiting embodiment of the present invention.

FIG. 14 is a perspective view showing a luminous intensity distribution pattern for a low beam formed on the imaginary vertical screen by light irradiated from the vehicular headlamp 10L according to the second embodiment to a front direction.

The luminous intensity distribution pattern PL for low beam is substantially similar to the case of the luminous intensity distribution pattern PL for low beam shown in FIG. 10 with regard to the luminous intensity distribution patterns PL 1, PL 2 formed by irradiating light from the front irradiating lamp piece units 30, 40. However, with regard to the luminous intensity distribution patterns PL 3A, PL 3B formed by irradiating light from the side irradiating lamp piece units 50A, 50B, the luminous intensity distribution pattern PL for low beam is brought into a positional relationship symmetric with the luminous intensity distribution pattern PL for low beam of FIG. 10 in the left and right direction.

Also in the second embodiment, although the surface shape of the vehicular headlamp 10L is flexed to the rear side, the luminous intensity distribution patterns PL 3A, PL 3B are prolonged sideways and can be formed after achieving thin formation of the lamp piece. In that case, the luminous intensity distributions PL 3A, PL 3B are formed at the positions shifted to the left side with respect to the front direction of the vehicle. Therefore, the recognizability can be promoted by sufficiently irradiating the front road face in the turning direction by the luminous intensity distribution patterns PL 3A, PL 3B that is prolonged sideways.

Further, by constituting the vehicle provided with the vehicular headlamp 10R according to the first embodiment and the vehicular headlamp 10L according to the second embodiment, even in turning either of the left and right directions, recognizability can be promoted by sufficiently irradiating the front road face in the turning direction.

Although in the above-described respective embodiments, an explanation has been given such that the side inclination angle θa of the side irradiating lamp piece unit 50A disposed on the inner side in the vehicle width direction is set to be about 15° and the side inclination angle θb of the side irradiating lamp piece unit 50B disposed on the outer side in the vehicle width direction is set to be about 30°, the angles may naturally be set to values other than these.

Additionally, although according to the above-described respective embodiments, the side irradiating lamp piece unit is constituted to provide the two side irradiating lamp piece units 50A, 50B, the present invention is not limited thereto. For example but not by way of limitation, there may be constructed a constitution having either a single or three or more of the light irradiating lamp piece units.

Also, although according to the above-described respective embodiments, an explanation has been given such that the front irradiating lamp piece units 30, 40 are constituted by the lamp piece units of the projector type, the front irradiating lamp piece units 30, 40 can be constituted by other lamp piece units (for example, lamp piece units of a parabolic type or a direct projecting type or the like).

Yet further, although the vehicular headlamps 10L, 10R according to the above-described respective embodiments are constructed by a constitution of containing only the lamp piece units 30, 40, 50A, 50B for forming the luminous intensity distribution pattern for low beam at inside of lamp chamber, lamp piece units for forming a luminous intensity distribution pattern for high beam can naturally be constituted to be contained in the above-described lamp chamber.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A vehicular headlamp constituted to form a luminous intensity distribution pattern for a low beam by irradiating light from a plurality of lamp piece units, each of said lamp piece units including a light source having a semiconductor light emitting element, wherein said plurality of lamp piece units comprise:
at least one front irradiating lamp piece unit that directs light in a front direction of a vehicle; and
at least one side irradiating lamp piece unit that directs light to an outer side in a vehicle width direction by an angle relative to the front direction, and
wherein each at least one side irradiating lamp piece unit comprises:
a reflector having a reflecting face comprising a curved face in a parabolic pillar shape and a focal line extending in a horizontal direction, said reflector diffusing light from said light source in said horizontal direction, said light source having said at least one semiconductor light emitting element and being arranged on the focal line.

2. The vehicular front lamp according to claim 1, wherein the light source of each said at least one side irradiating lamp piece unit is directed downward, and the reflecting face is on a lower side of the light source.

3. The vehicular headlamp according to claim 1, wherein a plurality of pieces of the at least one side irradiating lamp piece unit are contiguous with respect to each other in the horizontal direction, and
wherein the inclination angle of each of said at least one respective side irradiating lamp piece unit to an outer side in the vehicle width direction is larger as the lamp piece unit is increasingly disposed to the outer side in the vehicle width direction.

4. The vehicular headlamp according to claims 1, wherein each of the at least one front irradiating lamp piece unit comprises a projecting lens and a reflector, said reflector reflecting light from the light source in the front direction on a rear side of the projecting lens, having a reflecting face constituted such that light from the light source reflected by the reflecting face substantially converges to a vicinity of a focal point on the rear side of the projecting lens.

5. A vehicular headlamp provided on at least one side of a front end portion of a vehicle to generate a luminous intensity distribution, comprising:
at least one lamp piece having a plurality of lamp piece units, said plurality of lamp piece units comprising,
at least one first lamp piece unit configured to irradiate light to a front portion, and
at least one second lamp piece unit, configured to irradiate light at at least one angle with respect to said front portion, said at least one second lamp piece unit having a reflector with a curved face and a substantially horizontally extending focal line,
wherein an optical axis of said at least one first lamp piece unit is directed downward by about 0.5 to about 0.6 degrees,
wherein said at least one second lamp piece unit is of a parabolic pillar type comprising a light source, and said reflector arranged adjacent to said light source, said reflector having the curved face in a parabolic pillar shape and a pair of side walls of sides of said curved face, such that said focal line extends orthogonally with respect to a center axis of said at least one second lamp piece unit.

6. The vehicular headlamp of claim 5, wherein said pair of side walls are substantially vertical.

7. The vehicular headlamp of claim 5, wherein said light source comprises at least one semiconductor light emitting element arranged along said focal line.

8. A vehicular headlamp provided on at least one side of a front end portion of a vehicle to generate a luminous intensity distribution, comprising:
at least one lamp piece having a plurality of lamp piece units, said plurality of lamp piece units comprising,
at least one first lamp piece unit configured to irradiate light to a front portion, and
at least one second lamp piece unit, configured to irradiate light at at least one angle with respect to said front portion, said at least one second lamp piece unit having a reflector with a curved face and a substantially horizontally extending focal line, wherein an optical axis of said at least one first lamp piece unit is directed downward by about 0.5 to about 0.6 degrees, wherein said at least one second lamp piece unit comprises a first second lamp piece unit having a first side inclination angle and a second second lamp piece unit having a second side inclination angle different from said first side inclination angle.

9. The vehicular headlamp of claim 8, wherein said first side inclination angle is substantially greater than said second side inclination angle.

10. The vehicular headlamp of claim 8, wherein said first second lamp piece is positioned proximal to said at least one side with respect to said second second lamp piece.

11. A vehicular headlamp provided on at least one side of a front end portion of a vehicle to generate a luminous intensity distribution, comprising:

at least one lamp piece having a plurality of lamp piece units, said plurality of lamp piece units comprising, at least one first lamp piece unit configured to irradiate light to a front portion, and at least one second lamp piece unit, configured to irradiate light at at least one angle with respect to said front portion, said at least one second lamp piece unit having a reflector with a curved face and a substantially horizontally extending focal line, wherein an optical axis of said at least one first lamp piece unit is directed downward by about 0.5 to about 0.6 degrees, wherein said at least one first lamp piece unit is of a projector type, and includes a light source arranged on a rear side of a projecting lens, and a reflector positioned adjacent to said light source and configured to reflect light from said light source to said front portion.

12. The vehicular headlamp of claim 11, wherein said reflector is substantially elliptical and has an eccentricity that increases from a vertical section to a horizontal section thereof.

13. A vehicular headlamp provided on at least one side of a front end portion of a vehicle to generate a luminous intensity distribution, comprising:

at least one lamp piece having a plurality of lamp piece units, said plurality of lamp piece units comprising, at least one first lamp piece unit configured to irradiate light to a front portion, and at least one second lamp piece unit, configured to irradiate light at at least one angle with respect to said front portion, said at least one second lamp piece unit having a reflector with a curved face and a substantially horizontally extending focal line, wherein an optical axis of said at least one first lamp piece unit is directed downward by about 0.5 to about 0.6 degrees, wherein said at least one first lamp piece unit comprises a first first lamp piece unit having a first focal length, and a second first lamp piece unit having a second focal length that is greater than said first focal length.

14. The vehicular headlamp of claim 13, wherein said first first lamp piece unit is disposed proximal to said at least one side with respect to said second first lamp piece unit.

15. A vehicular headlamp provided on at least one side of a front end portion of a vehicle to generate a luminous intensity distribution, comprising:

at least one lamp piece having a plurality of lamp piece units, said plurality of lamp piece units comprising, at least one first lamp piece unit configured to irradiate light to a front portion, and at least one second lamp piece unit, configured to irradiate light at at least one angle with respect to said front portion, said at least one second lamp piece unit having a reflector with a curved face and a substantially horizontally extending focal line, wherein an optical axis of said at least one first lamp piece unit is directed downward by about 0.5 to about 0.6 degrees, wherein said plurality of lamp pieces are each supported by an aiming mechanism fixed to a support bracket.

* * * * *